United States Patent
Janzen

(10) Patent No.: US 7,389,369 B2
(45) Date of Patent: Jun. 17, 2008

(54) ACTIVE TERMINATION CONTROL

(75) Inventor: Jeffery W. Janzen, Meridian, ID (US)

(73) Assignee: Micron Technology, Inc., Boise, ID (US)

( * ) Notice: Subject to any disclaimer, the term of this patent is extended or adjusted under 35 U.S.C. 154(b) by 252 days.

(21) Appl. No.: 11/216,672

(22) Filed: Aug. 31, 2005

(65) Prior Publication Data

US 2005/0286319 A1    Dec. 29, 2005

Related U.S. Application Data

(62) Division of application No. 10/383,939, filed on Mar. 7, 2003, now Pat. No. 7,142,461.

(60) Provisional application No. 60/427,917, filed on Nov. 20, 2002.

(51) Int. Cl.
   *G06F 13/00* (2006.01)
(52) U.S. Cl. .................. 710/100; 710/101; 710/105
(58) Field of Classification Search .................. 710/100, 710/101, 105, 126, 308; 326/21, 30
   See application file for complete search history.

(56) References Cited

U.S. PATENT DOCUMENTS

| | | | |
|---|---|---|---|
| 5,467,455 A | 11/1995 | Gay et al. | |
| 6,040,983 A | 3/2000 | Baudouin et al. | |
| 6,051,989 A | 4/2000 | Walck | |
| 6,157,206 A | 12/2000 | Taylor et al. | |
| 6,157,688 A * | 12/2000 | Tamura et al. | 375/348 |
| 6,191,663 B1 | 2/2001 | Hannah | |
| 6,271,704 B1 | 8/2001 | Babcock et al. | |
| 6,308,232 B1 | 10/2001 | Gasbarro | |
| 6,356,106 B1 | 3/2002 | Greeff et al. | |
| 6,373,127 B1 | 4/2002 | Baudouin et al. | |
| 6,438,068 B1 | 8/2002 | Roohparvar | |
| 6,441,595 B1 | 8/2002 | Pelissier et al. | |
| 6,445,624 B1 | 9/2002 | Janzen et al. | |
| 6,519,173 B2 * | 2/2003 | Funaba et al. | 365/63 |
| 6,538,951 B1 | 3/2003 | Janzen et al. | |
| 6,717,832 B2 | 4/2004 | Johnson et al. | |
| 6,724,666 B2 | 4/2004 | Janzen et al. | |
| 6,754,132 B2 | 6/2004 | Kyung | |
| 6,834,014 B2 | 12/2004 | Yoo et al. | |

(Continued)

FOREIGN PATENT DOCUMENTS

EP    0817441 A    1/2001

(Continued)

OTHER PUBLICATIONS

"Search Report for International Application No. PCT/US3/36103", (Completed Nov. 22, 2005),9 pgs.

*Primary Examiner*—Vu A Le
(74) *Attorney, Agent, or Firm*—Schwegman, Lundberg & Woessner, P.A.

(57) ABSTRACT

A method and apparatus are provided for active termination control in a memory. In an embodiment, the memory turns on active termination based on information programmed into one or more mode registers of the memory. In an embodiment, the memory maintains the active termination in an on state for a predetermined time based on information programmed into one or more mode registers of the memory.

37 Claims, 8 Drawing Sheets

U.S. PATENT DOCUMENTS

| | | |
|---|---|---|
| 6,917,546 B2 | 7/2005 | Matsui et al. |
| 7,126,863 B2 | 10/2006 | Janzen |
| 7,130,228 B2 | 10/2006 | Janzen |
| 7,142,461 B2 | 11/2006 | Janzen |
| 7,145,815 B2 | 12/2006 | Janzen |
| 7,245,541 B2 | 7/2007 | Janzen |
| 2002/0024884 A1 | 2/2002 | Roohparvar |
| 2002/0083255 A1 | 6/2002 | Greeff et al. |
| 2002/0118578 A1 | 8/2002 | Janzen et al. |
| 2002/0133666 A1 | 9/2002 | Janzen et al. |
| 2003/0002355 A1 | 1/2003 | Janzen et al. |
| 2003/0016550 A1 | 1/2003 | Yoo et al. |
| 2003/0018845 A1 | 1/2003 | Janzen |
| 2003/0039151 A1 | 2/2003 | Matsul |
| 2003/0043681 A1 | 3/2003 | Janzen et al. |
| 2003/0099138 A1 | 5/2003 | Kyung |
| 2003/0110348 A1 | 6/2003 | Janzen |
| 2003/0117881 A1 | 6/2003 | Johnson et al. |
| 2003/0126338 A1 | 7/2003 | Dodd et al. |
| 2004/0179420 A1 | 9/2004 | Kyung |
| 2005/0286311 A1 | 12/2005 | Janzen |
| 2005/0286317 A1 | 12/2005 | Janzen |
| 2005/0286318 A1 | 12/2005 | Janzen |
| 2006/0002201 A1 | 1/2006 | Janzen |
| 2006/0050597 A1 | 3/2006 | Janzen |

FOREIGN PATENT DOCUMENTS

| | | |
|---|---|---|
| JP | 7182078 | 7/1995 |
| JP | 2003223784 | 8/2003 |

\* cited by examiner

ACTIVE TERMINATION CONTROL

RELATED APPLICATIONS

The present application is a divisional of U.S. application Ser. No. 10/383,939, filed Mar. 7, 2003, issued as U.S. Pat. No. 7,142,461, which claims priority to U.S. Provisional Application No. 60/427,917, filed Nov. 20, 2002, each of which is incorporated herein by reference.

FIELD OF THE INVENTION

The present invention relates to memory devices. In particular it relates to active termination control following read and write commands in memory devices.

BACKGROUND OF THE INVENTION

Many electronic systems employ controllers and memory devices that send information back and forth among each other. Typically, the information is transmitted on one or more system buses. These buses act as transmission lines. Consequently, these buses require designs that consider signal reflections associated with devices coupled to a transmission line. Typically, transmission lines are terminated using a resistor coupled between the transmission line and a power supply node.

For electronic systems, such as computers, termination is provided by external resistors that are often located on the motherboard of the computer. An external resistor having an impedance that matches the impedance of the transmission line is selected to terminate a transmission line such as the interconnection signal lines of buses connecting a plurality of integrate circuits. When the external resistance matches the resistive component of the transmission line impedance, there is little or no signal reflection. However, external resistors for all the signal lines located on system boards use a large amount of area on these boards.

As an alternative to external resistors, on chip termination or on die termination, also known as active termination, can be used on the integrated circuits of the system. Using on chip termination requires additional interconnection between the devices of the system such as the controllers and the memories. This additional interconnection also requires that the controllers and other devices of the system use additional pin connectors. The amount of additional connection lines and pin connections on the various devices depends on the overall design for providing on chip termination.

What is needed is a means of providing control of active termination control that is flexible and does not require the addition of a larger number of pin connections for an electronic system.

DETAILED DESCRIPTION OF THE PREFERRED EMBODIMENTS

In the following detailed description of the preferred embodiments, reference is made to the accompanying drawings which form a part hereof, and in which is shown by way of illustration, specific embodiments in which the inventions may be practiced. These embodiments are described in sufficient detail to enable those skilled in the art to practice the invention, and it is to be understood that other embodiments may be utilized and that process, electrical, or mechanical changes may be made without departing from the scope of the present invention. The following detailed description is, therefore, not to be taken in a limiting sense, and the scope of the present invention is defined only by the appended claims and their equivalents.

A method and apparatus are provided for active termination control in a memory by a module register providing an active termination control signal to the memory. The module register monitors a system command bus for read and write commands. In response to detecting a read or write command, the module register generates an active termination control signal to the memory. The memory turns on active termination based on information programmed into one or more mode registers of the memory. In one embodiment, the memory column address strobe (CAS) latency is used to determine a turn on time, and the memory burst length (BL) is used to determine a turn off time following the turn on of the active termination. The turn on time is set at the CAS latency minus a number of clock cycles. After the active termination is turned on, it is maintained on for a length of time set equal to about a number of cycles equal to BL/2 for a Double Data Random Access Memory (referred to as DDR) plus one and one-half clock cycles. For a memory that reads and writes one data bit per cycle, the active termination is maintained on for a length of time set equal to about the number of cycles equal to the BL of the memory.

System

Figure 1:
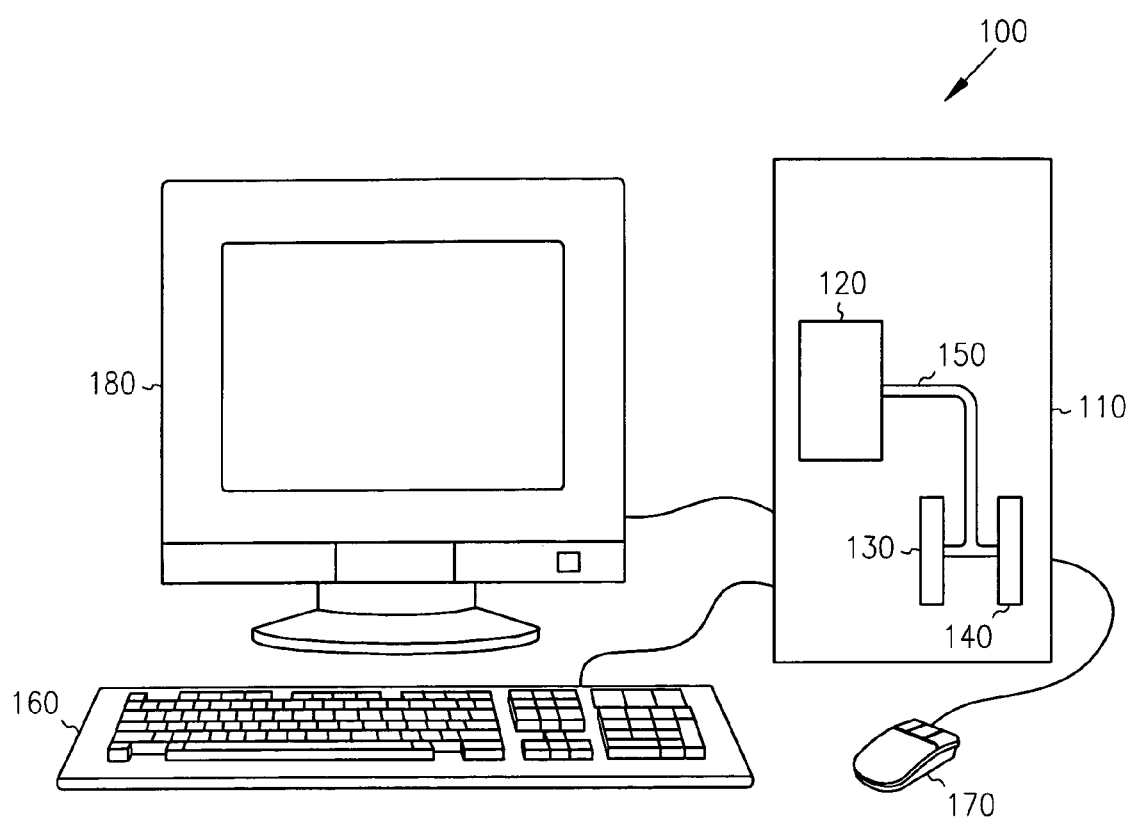
FIG. 1 shows an embodiment of a information handling system including a computer system having a controller coupled to memory modules, in accordance with the teachings of the present invention.

FIG. 1 shows an embodiment of a information handling system 100 including a computer system 110 having a controller 120 coupled to memory modules 130, 140, in accordance with the teachings of the present invention. Controller 120 is coupled to memory modules 130, 140 by, among other paths, a command bus 150. Memory modules 130, 140 include one or more memory devices with active termination designed within each memory device. Further, information handling system 100 can also include a keyboard 160, a mouse 170, and a monitor 180 coupled to computer system 110 to receive inputs from and display information to system users.

Figure 2:
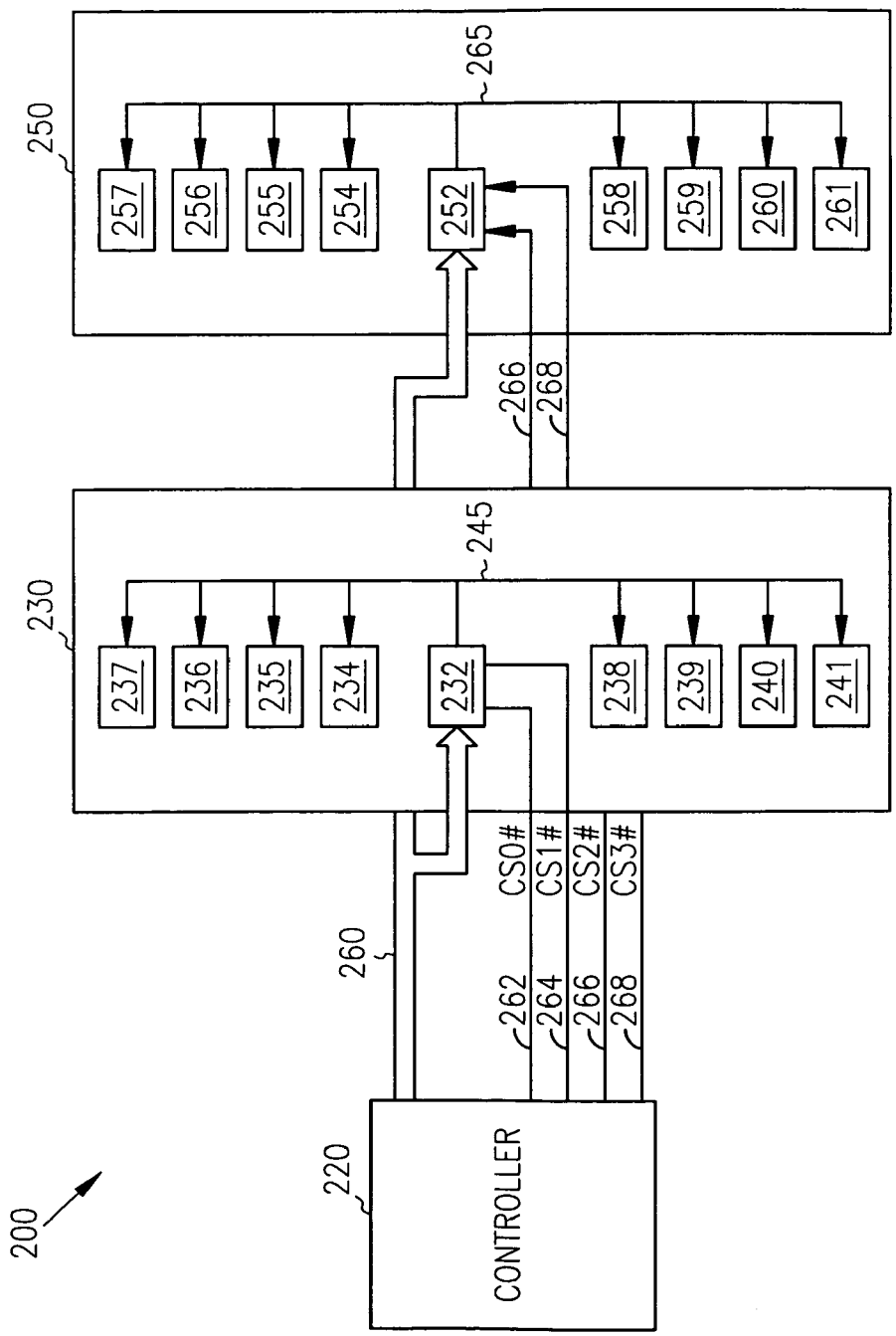
FIG. 2 shows an embodiment of a system having a controller coupled to memory modules, in accordance with the teachings of the present invention.

FIG. 2 shows an embodiment of a system 200 having a controller 220 coupled to memory modules 230, 250, in accordance with the teachings of the present invention. In the embodiment of FIG. 2, memory module 230 includes a module register 232 and memory devices 234-241, where module register 232 is coupled to each of the memories 234-241 via a plurality of lines 245. Similarly, memory module 250 includes a module register 252 and memory devices 254-261. Module register 252 is coupled to each of the memories 254-261 via a plurality of lines 265. Further, module register 232 on memory module 230 and module register 252 on memory 250 are coupled to a common command bus that is a system command bus 260 for system 200 to which controller 220 is also coupled. In addition to system command bus 260, controller 220 is coupled to module register 232 via a chip select (CS#0) line 262 and a CS#1 line 264, and is coupled to module register 252 via a CS#2 line 266 and a CS#3 line 268. As can be appreciated that those skilled in the art, system 200 includes other elements, other buses, and communication paths among the elements, which are not shown. The figures focus on those elements for understanding the various embodiments according to the teachings of the present invention.

Module register 232 operates like a buffer on the module that re-drives the control signals from system control bus 260 to the eight memory devices 234-241 on module 230. The address and controls are routed into module register 232, and then are re-clocked to memory devices 234-241 on the next clock cycle. As a result, heavier loads can be placed on the system bus 260 without making the address and control lines too heavily loaded. Other embodiments include 16, 32, or 36 memory devices on a single memory module. The number of memory devices varies usually to higher density memory modules. Module register 232 is coupled to the memory devices 234-241 via control lines 245 that are coupled to each memory device providing such signals as row address strobe (RAS), CAS, and write enable (WE). Other signals such as CS and clock enable (CKE) have separate lines from the register module 232. Memory devices 234-241 primarily monitor their chip selects inputs to determine if a read or a write is occurring for the given memory device. Further, each memory device 234-241 is provided with an active termination, rather than having termination on the mother board.

Module register 232 is coupled to controller 220 by CS#0 line 262 and CS#1 line 264. Module register 252 is configured like module register 232, but coupled to controller by CS#2 line 266 and CS#3 line 268. This configuration is used to access two groups of memory devices at different times, with one group typically on one side of the memory module 230 and the other group on the other side of memory module 230. Such a configuration is said to be of rank two. However there are modules that are double sided that only have one chip select, and hence are of rank one. The rank of the module determines how while reading or writing to the memory devices, the signals are terminated. For a rank of one, in some embodiments a memory device terminates itself. For a two module system, if the write or read operation is to module one, then module two is the module that actually terminates. As a result, both module register 232 of memory module 230 and module register 252 of memory module 250 monitors the system control bus 260 for read and write commands, so that each memory module 230, 250 is provided with information regarding the read/write activities of each other to facilitate correct termination.

Module Register

Figure 3:
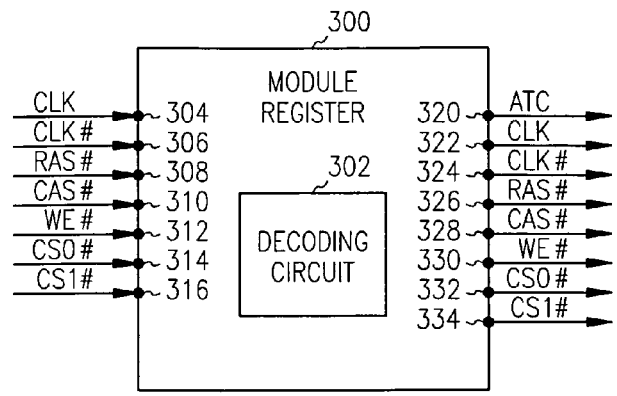
FIG. 3 shows an embodiment of a module register having a decoding circuit, a plurality of input command ports, chip select ports, and active termination port for outputting an active termination control signal, in accordance with the teachings of the present invention.

FIG. 3 shows an embodiment of a module register 300 having a decoding circuit 302, a plurality of input command ports 304, 306, 308, 310, 312, chip select ports 314, 316, and an active termination port 320 for outputting an active termination control (ATC) signal, in accordance with the teachings of the present invention. Clock signal (CLK) and inverted clock signal (CLK#) are received at ports 304, 306, respectively. Inverted row address strobe (RAS#), inverted column address strobe (CAS#), and inverted write enable (WE#) signals are received at ports 308, 310, and 312, respectively, while CS0# and CS1# signals are received at ports 314, and 316, respectively. Module register 300 re-clocks these signals and drives out CLK, CLK#, RAS#, CAS#, WE#, CS0#, and CS1# signals from ports 322, 324, 326, 328, 330, 332, and 334, respectively, to memory devices to which it is coupled. In addition to re-clocking and driving control signals to memory devices, module register 300 provides a means for controlling active termination of the memory device to which it is coupled.

Decoding circuit 302 uses the control signals received from a system command bus to monitor whether a read or write command has been received by any memory module coupled to the same system command bus. Upon detecting a write or read command, decoding circuit 302 provides an ATC signal at port 320. If a write command is decoded, the ATC signal is provided from port 320 coincident with a write command being issued on a memory module. If a read command is decoded, the ATC signal is provided from port 320 one cycle after a read command issues on a memory module. Module register 300 monitors the system bus and then issues the active termination control to the memory devices. As a result, there are not additional pins on the module or on the chip set. Using module register 300 with one port, or pin, on each memory device eliminates the need for ATC ports on each memory module and ATC ports on a controller coupled to each memory module. Module register 300 watches the system command bus and controls the signals to the memory devices to which it is coupled, providing control of the ATC signal.

Figure 4:
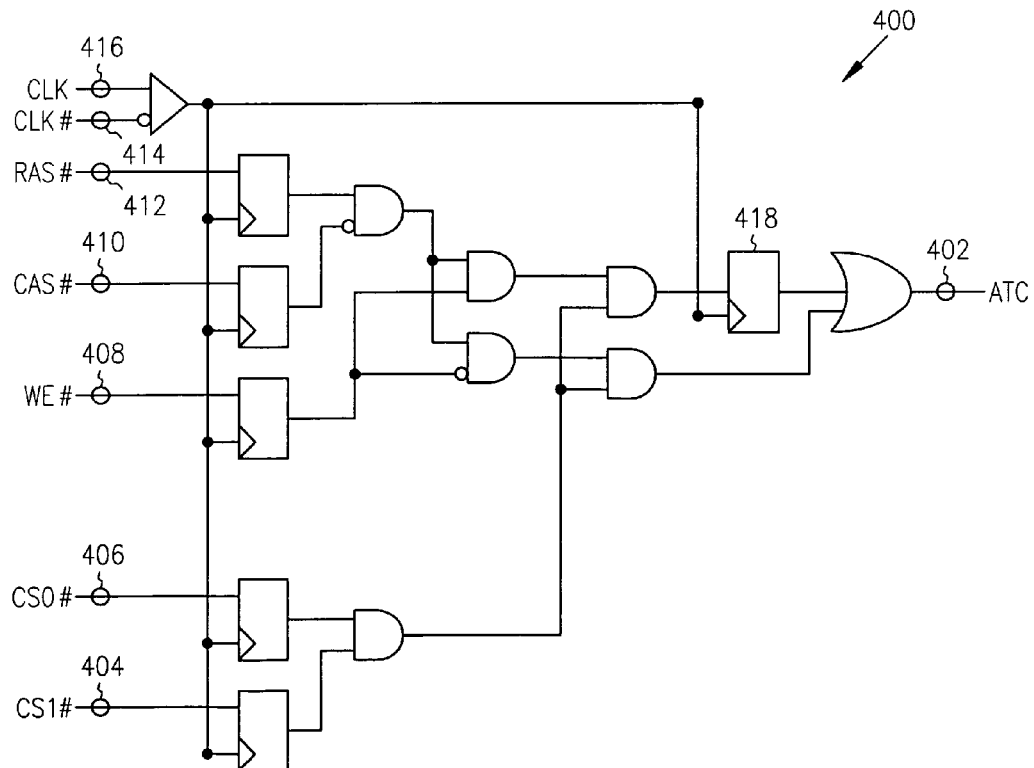
FIG. 4 shows an embodiment of a decoding circuit of a module register having an active termination control port for outputting an active termination control signal based on signals received on chip select ports and a plurality of input command ports, in accordance with the teachings of the present invention.

FIG. 4 shows an embodiment of a decoding circuit 400 of a module register having an active termination port 402 for outputting an active termination control signal based on signals received on chip select ports 404, 406 and a plurality of input command ports 408, 410, 412, 414, and 416, in accordance with the teachings of the present invention. CLK and CLK # received at ports 416 and 414, along with WE#, CAS#, and RAS# received at ports 408, 410, and 412, respectively, are input signals for decoding circuit 400, which decodes commands to memory devices selected. CS1# or CS0# at ports 404, 406, respectively, are used in logic circuits to enable an output ATC signal, or pulse. For a two module system, CS0# and CS1# enable the output of the ATC signal on one memory module, while on the other memory module memory devices are selected for read and write operations.

Decoding circuit 400 is a command decoding structure that includes a set of gates decoding either a read command or a write command. If a write command propagates through decoding circuit 400 of a module register, an ATC signal would be transmitted from port 402 to memory devices coupled to the module register. A read command that propagates through decoding circuit 400 of a module register to transmit an ATC signal from port 402 must first propagate through latch 418. Latch 418 provides a one clock cycle delay relative to the issuance of a read command from another module register.

Memory

Figure 5:
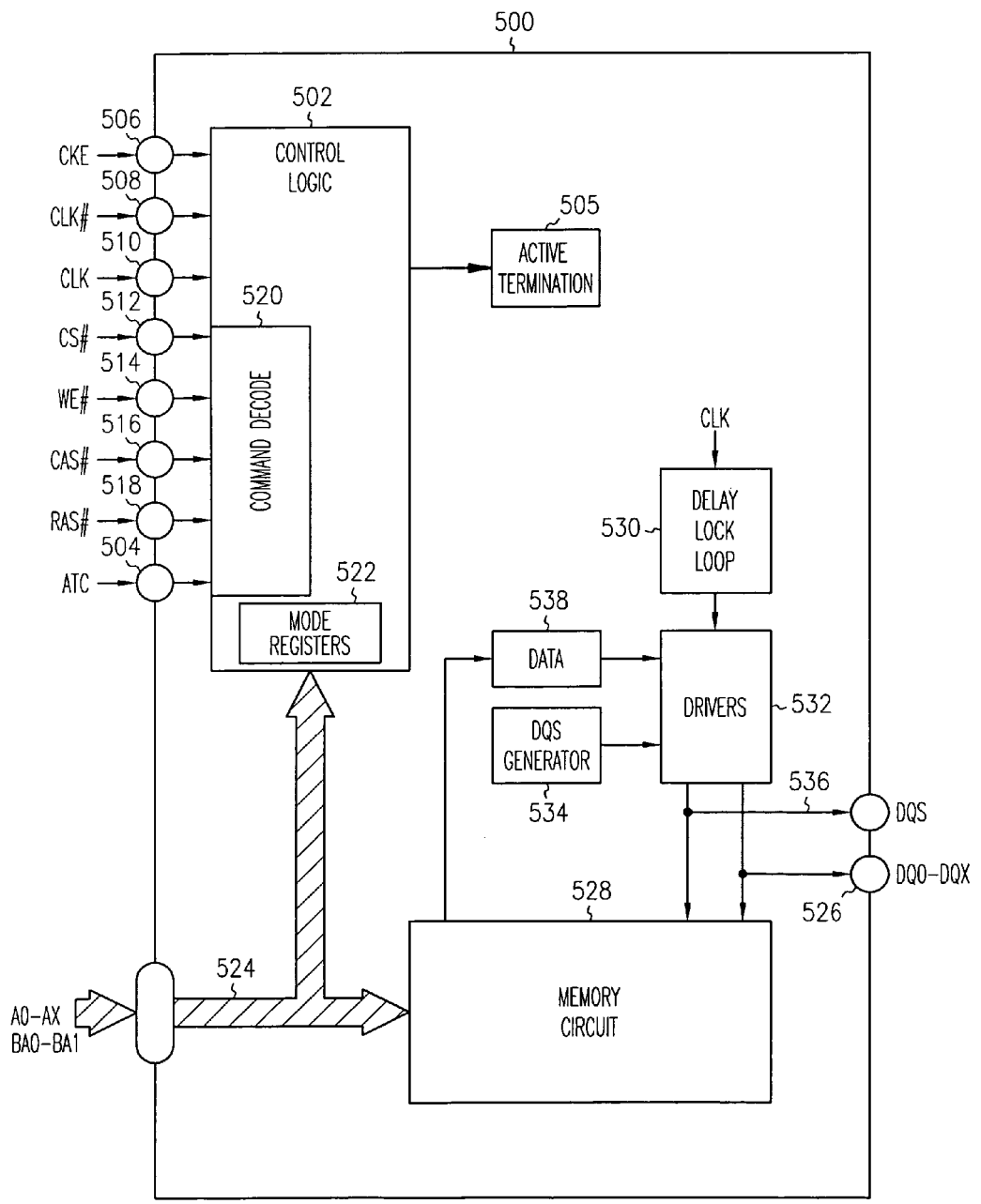
FIG. 5 shows an embodiment of a memory including a control logic coupled to an active termination control port for receiving an active termination control signal and coupled to an active termination, in accordance with the teachings of the present invention.

FIG. 5 shows an embodiment of a memory 500 including a control logic 502 coupled to an active termination control port 504 for receiving an active termination control signal and coupled to an active termination 505, in accordance with the teachings of the present invention. Control logic 502 logic includes timing circuitry to turn on and to turn off the active termination. Control logic 502 represents a standard memory control logic along with additional circuitry or state machine for controlling the state of the active termination on the memory. For convenience, FIG. 5 does not contain all the elements of a memory, but contains those elements of a memory necessary for understanding the embodiments discussed, as can be appreciated by those skilled in the art.

In addition to receiving an ATC signal at port 504, control logic 502 receives CKE, CLK#, and CLK at ports 506, 508, 510, respectively. Memory 500 also receives command signals CS#, WE#, CAS#, and RAS# at ports 512, 514, 516, and 518, respectively, that are decoded in command decode 520. In addition, memory 500 has one or more mode registers 522 as part of control logic 502 or coupled to control logic 502. The one or more mode registers 522 are programmed with information for operating memory 500 including CAS latency, operating mode, burst length, and burst type. Additional operating information can be contained in the one or more mode registers 522, depending on the particular memory.

Memory 500 also includes an address bus 524, a data bus 526, and a memory circuit 528 that contains data stored in memory 500. Memory circuit 528 is coupled to address bus 524 for receiving information identifying the location for reading or writing data from data bus 526. The identification of the location is contained in BA0-BA1 for selecting a memory bank and in A0-AX for selecting an address within a memory bank. The management of the read and write operations is performed by control logic 502 upon receiving commands from a processor such as controller 220 of FIG. 2. The read and write operations of memory 500 are controlled using a delay lock loop having a CLK input to adjust timing provided to drivers 532. The read and write operations are further controlled with a data strobe DQS that is provided by a DQS generator 534 suppling drivers 532 to control the DQS placed on DQS line 536. In addition, the drivers also clock out data 324 received from memory circuit 314 for transferral to data bus 526 in data bus locations DQ0-DQX.

Memory 500 uses one or more registers as mode registers in which operating information is programmed into memory 500 by a controller, typically, on initialization or boot up (start of system). As mentioned, this information includes CAS latency, operating mode, burst length, burst type. As is known, the burst length determines the maximum number of column locations that can be accessed for a given read or write command. Typically, the burst type is either sequential or interleaved, and the CAS latency is the number of clock cycles between the registration of a read command by memory 500 and the availability of the first bit of output data from memory 500. The operating mode can either be normal operation or normal operation with a reset of the delay lock loop (DLL). The one or more mode registers 522 can also be programmed with information for controlling active termination.

Control logic 502 includes a timing circuit to turn on the active termination at a predetermined time after an active termination control signal is received at the active termination control port. The turn-on of the active termination is set by memory 500 using one or more bits defining a CAS latency. The turn-on of the active termination can further be adjusted by an additive latency (AL) that is also programmed into one or more mode registers. In an embodiment, the timing circuitry of control logic 502 is configured to turn-on active termination at the CAS latency minus two clock cycles plus the additive latency. In one embodiment, the additive latency is zero. The control logic also includes a timing circuit to turn off the active termination at a predetermined time after turning the active termination device on. In one embodiment, control logic 502 is configured to use the bits defining the burst length to set a turn off time for the active termination. For convenience, the number of cycles equal to the BL will also be referred to as burst length, BL. The timing circuit of control logic 502 sets a turn off time for active termination at a burst length divided by two, plus one and one-half a clock cycle after turning on the one active termination. A burst length for a DDR is divided by two, since one data bit is read out on a rising edge of a clock and another data bit is read out on a falling edge of the same clock. For a memory with one data bit read for one clock cycle, the turn off time for the active termination would be the burst length plus one and one-half a clock cycle after turning on the one active termination.

In one embodiment, memory device 500 has active termination with multiple termination values. The one or more mode registers contain one or more bits to select one of the multiple active termination values. In an embodiment, the multiple active termination values are 75 ohms and 150 ohms. In one embodiment, the 75 ohm termination value is used when the memory is in a two module system, the 150 ohm termination value is used when the memory is in a one module system.

In a two module or two slot system, command signals to write or read to memory devices on one module is accompanied by ATC turn on signals to memory devices on the other module. However, in systems with only one module, there is no second module for active termination. In a one module system, each memory self terminates for write operations and does not do anything for read operations. To accomplish this self termination for writes in a one module system, memory 500 includes one or more bits in one or more mode registers 522 that indicates that memory 500 is in a single slot or a dual slot system. Memory 500 has logic circuitry such that whenever one or more bits selects a single slot system, memory 500 is enabled to ignore a received active termination control signal. When memory 500 is programmed on initialization as a single slot system, the programmed bits are used to turn on self termination upon receiving a write command using the CAS latency and additive latency information in the one or more mode registers 522. The active termination is turned off after turning on the active termination using burst length information programmed in the one or more mode registers 522.

In another embodiment, memory 500 includes one or more mode registers with information that enables or disables active termination.

Thus, one or more mode registers are used to turn-on and turn-off active termination on memory 500 based on the information programmed into these registers. This configuration provides more programmable control than using a external signal to turn on active termination and another external signal to turn off active termination, or equivalently, turning active termination on and off with the two transitions of a single active termination signal.

Memory 500, as well as module register 300 and controller 220, can each be realized as a single integrated circuit. Memory 500 can be formed on a semiconductor die using a substrate, where the substrate is a material such as silicon, germanium, silicon on sapphire, gallium arsenide, or other commonly used semiconductor material. The elements of memory 500 are fabricated using conventional processing means for forming the various circuits within the semiconductor material and for providing electrical connections for coupling to an address bus, a data bus, and control lines for communication with a controller or a processor.

The various embodiments of memory 500 along with the various embodiments of module register 300 of FIG. 3 can be coupled with a controller such as controller 220 of FIG. 2 to form system 200 to provide a system with the ability to manage its active termination control. Further, system 200 can use one or more controllers having various embodiments of controller 220 to program the one or more mode registers 522 of each memory 500 to which it is coupled independent of the other memories.

Data Structure

Figure 6:
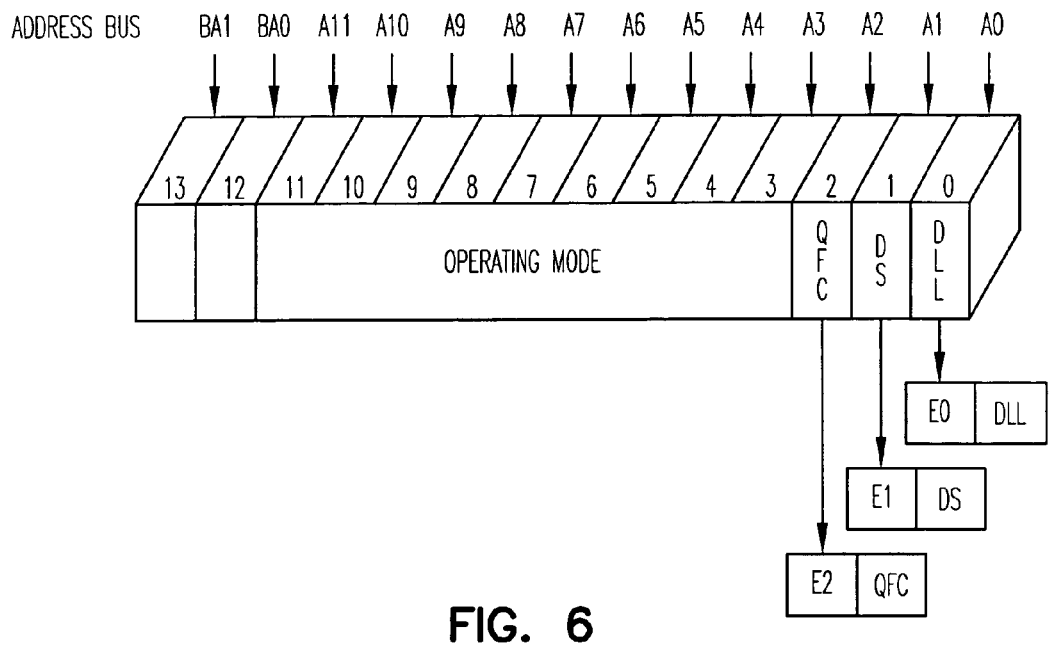
FIG. 6 shows an embodiment of an extended mode register having bit locations, which provide information for active termination control, in accordance with the teachings of the present invention.

FIG. 6 shows an embodiment of an extended mode register having bit locations, which provide information for active termination control, in accordance with the teachings of the present invention. The extended mode register includes bit locations 0, 1, 2 for information regarding delay lock loop (DLL), drive strength (DS), and flow control (QFC), respectively. Location E0 provides for DLL enable/disable. Location E1 provides for information on drive strength, and E2 provides for QFC disabling of flow control. The extended mode register of a memory such as memory 500 of FIG. 5 is operatively coupled to the address bus 524 for programming by a controller such as controller 220 of FIG. 2. Controller 220, or an intermediate controller, programs information into the extended mode register during initialization using the address bus. Generally, the BA1, BA2 locations of the address bus are used to distinguish between programming a standard mode register of memory 500 and an extended mode register. Typically, BA1=0 and BA0=0 is used to program a standard mode register, while BA1=0 and BA0=1 is used to program a standard mode register.

The extended mode register can be used to program one or mor bits for use in active termination control, since the bits, 3-11, for operating mode have not been completely set by a standardization body. In one embodiment, the data structure for the extended mode register includes a field containing data representing a single slot or a dual slot memory system. The field includes at least one bit for selecting a single slot or a dual slot system. In another embodiment, the data structure for the extended mode register includes a field containing data representing multiple termination values for a memory device. The field includes one or more bits for selecting either a 75 ohm termination value or a 150 ohm termination value. In another embodiment, the data structure for the extended mode includes a field having one or more bits containing data representing enabling or disabling active termination control for a memory.

Alternatively, the active termination information is programmed into one or more mode registers other than the standard mode register and the extended mode register, both of which usually adhere to a data structure defined by a standardization body such as JEDEC. CAS latency and burst length are typically programmed into the standard mode register.

Figure 7:
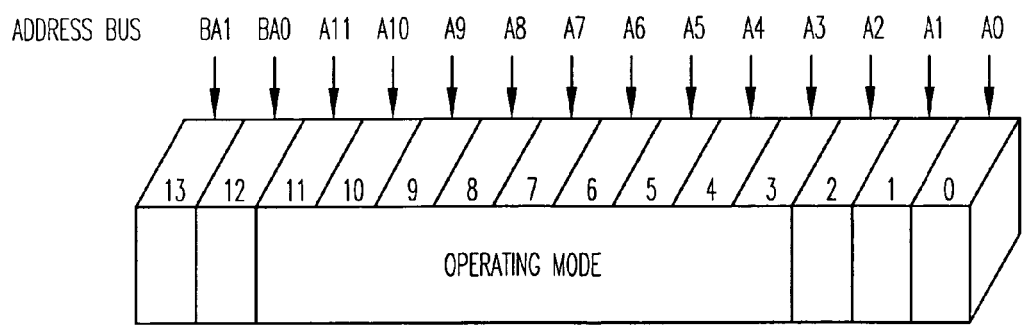
FIG. 7 shows an embodiment of a mode register using bit locations, which provide information for active termination control, in accordance with the teachings of the present invention.

FIG. 7 shows an embodiment of a mode register using bit locations, which provide information for active termination control, in accordance with the teachings of the present invention. Bit locations 12, 13 are operatively coupled to address locations BA0, BA1, respectively to provide identification of the mode register to be programmed on initialization. The remaining bit locations, 0-11, are operatively coupled to address bus locations A0-A11, respectively. The bit locations, 0-11, can be used for active termination control. In one embodiment, the data structure for the mode register includes a field containing data representing a single slot or a dual slot memory system. The field includes at least one bit for selecting a single slot or a dual slot system. In another embodiment, the data structure for the mode register includes a field containing data representing multiple termination values for a memory device. The field includes one or more bits for selecting either a 75 ohm termination value or a 150 ohm termination value. In another embodiment, the data structure for the mode includes a field having one or more bits containing data representing enabling or disabling active termination control for a memory.

As mentioned previously, the mode registers of a memory are programmed by a controller during initialization of the memory. Alternately, the mode registers can be programmed after initialization using a specified command sequence. Further, the mode registers of FIG. 6 and FIG. 7 are programmed by a controller providing a data signal for the memory embodied in a set of electrical signals including data representing a single slot or a dual slot system that includes a data portion for selecting the single slot or the dual slot system. The data signal includes a data portion for selecting a single slot or a dual slot system with at least one bit for selecting a single slot or a dual slot system. With the data portion configured to select a single slot system, the data portion programs the memory to ignore a received active termination control signal. In another embodiment, the data signal further includes data representing selection of multiple active termination values with a data portion having one or more bits to select either a 75 ohm termination value or a 150 ohm termination value. In another embodiment, the data signal further includes data representing enabling or disabling an active termination control in the memory device with a data portion having one or more bits to enable or disable the active termination control.

The one or more mode registers are programmed in a memory on initialization of the memory by a controller or processor on boot up, or start up. The mode registers are programmed with data including data portions as discussed above. The controller programs these mode registers based on instructions stored in a computer readable medium that the controller accesses for initialization instructions. This computer readable medium may be memory locations within the controller or any other computer readable medium operatively coupled to the controller. The computer-readable medium has computer-executable instructions for performing a method including determining a set of bits to be sent to and loaded into one or more registers of a memory, arranging the bits in a predetermined format, and outputting the set of bits. In one embodiment, the set of bits includes at least one bit for selecting a single slot or a dual slot system. When the set of bits indicates the selection of a single slot system, the outputting of the set of bits to a memory programs the memory to ignore a received active termination control signal. Additionally, the computer-readable medium can include in the set of bits one or more bits, for selecting multiple termination values. For instance, the one or more bits are provided for selecting a 75 ohm termination value or a 150 ohm termination value. In another embodiment, the set of bits additionally includes one or more bits for enabling or disabling active termination control. It can be appreciated by those skilled in the art, that the computer readable medium accessed by a controller or processor can be of any computer readable form such as, but not limited to, CD-ROMs, non-volatile ROM, ROM, and RAM.

Operation

Figure 8:
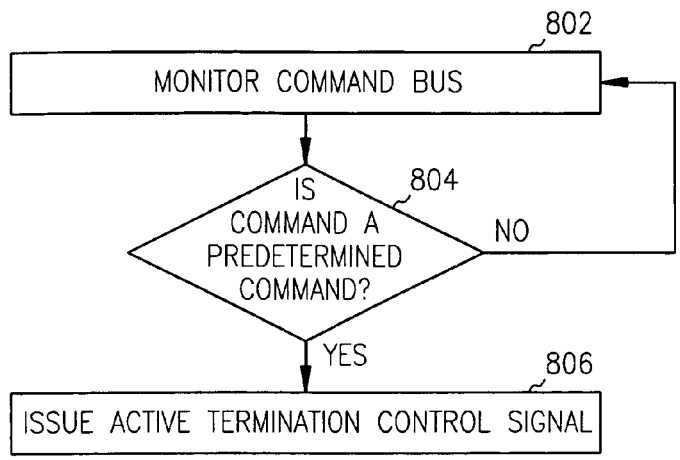
FIG. 8 shows a flow diagram of an embodiment for a method for active termination control, in accordance with the teachings of the present invention.

FIG. 8 shows a flow diagram of an embodiment for a method for active termination control, in accordance with the teachings of the present invention. A module register such as module register 300 of FIG. 3 is used in system 200 of FIG. 2 as module registers 232 and 252. At block 802, module register 232 monitors system command bus 260. At block 804, a determination is made as to whether the command is a predetermined command. At block 806, in response to determining that a predetermined command is on command bus 260, an active termination control signal is issued.

In one embodiment, module register 232 monitors the command bus for a write command or a read command, while also monitoring the chip select or inverted chip select signals that it receives from controller 220. In a two slot, or two module, system, module register 232 uses the chip select information to determine whether or not to output an ATC signal. For instance, if the write or read command is for memory on module one, the active termination is performed on module two. Thus, in FIG. 2, with a write or read to memory module 230, module register 252 provides an ATC signal for active termination on memory devices on module 250. If a write command for memory devices on memory module 230 is detected, module register 252 generates an ATC signal coinciding with the module register 232 issuing a write command. Both the ATC signal and the module register generated write command are issued a clock cycle after the write command is monitored from the system command bus 260. If a read command for memory devices on memory module 230 is detected, module register 252 generates an ATC signal one clock cycle after the module register 232 issues a write command. The module register generated read command is issued a clock cycle after the read command is monitored from the system command bus 260, with the ATC signal generated two clock cycles after the read command is monitored from the system command bus 260.

Figure 9:
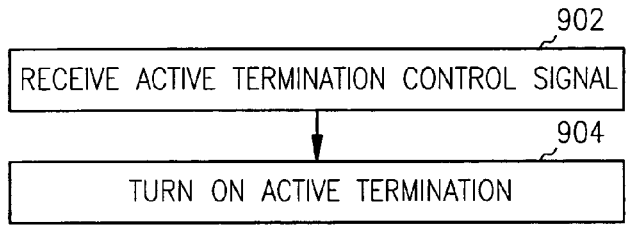
FIG. 9 shows a flow diagram of another embodiment for a method for active termination control, in accordance with the teachings of the present invention.

FIG. 9 shows a flow diagram of another embodiment for a method for active termination control, in accordance with the teachings of the present invention. At block 902, an active termination control signal is received. At block 904, active termination is turned on. A memory such as memory 500 of FIG. 5 is used on memory modules 230, 250 in system 200 of FIG. 2. Memory 500 receives an ATC signal, and turns on active termination based on information in one or more mode registers 522. Turning on active termination occurs at a predetermined time after receiving the active termination control signal. In one embodiment, the active termination is turned on based on information regarding CAS latency and additive latency programmed in one or more mode registers. The turn on time is set at about a CAS latency less two clock cycles plus an additive latency after receiving the ATC signal. For example, for a CAS latency of four programmed in a standard mode register and an additive latency of zero, the active termination turns on two clock cycles after the ATC signal is received. In another embodiment, for a memory without additive latency, active termination is set at about a CAS latency less two clock cycles after receiving the ATC signal. It can be appreciated by those skilled in the art, that the predetermined time for turning on the active termination can be set using other parameters. Other predetermined turn on times include using the CAS latency minus an additional number of clock cycles, where the additional number of clock cycles can be any number of clock cycles, including fractional clock cycles, less than the CAS latency. It is a matter of selecting the additional clock cycles such that the active termination is turned on for a short period before the data is read or written.

The active termination is maintained in an on state for a predetermined length of time. The predetermined time is determined using information programmed in one or more mode registers. In one embodiment, the predetermined time is set at about a burst length divided by two plus one and a half clock cycles. For a DDR, the burst length is divided by two. For a memory with one bit read or written in one clock cycle, the burst length is not divided by two. For instance, for a burst length of eight programmed in a standard mode register, the active termination is maintained on for five and one-half clock cycles after the active termination is turned. It can be appreciated by those skilled in the art, that the predetermined length of time for maintaining the active termination can be set using other parameters. Other predetermined lengths of time include using the burst length or burst length divided by two plus an additional number of clock cycles, where the number of clock cycles can be 1, 1.5, 2, 2.5, or other number. It is a matter of selecting the additional clock cycles such that the active termination is still on for a short period after the data is read or written.

In an embodiment, a method for active termination control in a memory includes accessing information indicating an enable or disable of an active termination control, determining a turn on time for the active termination, and determining a turn off time for the active termination. The information indicating an enable or disable of the active termination control is provided by at least one bit in a mode register. The one or more bits indicating an enable or disable of the active termination control is combined with latency information to set a turn on time at a predetermined period after receiving an ATC signal. In one embodiment, the predetermined time is set to a CAS latency less two clock cycles plus an additive latency after receiving an ATC signal. Alternately, there is no additive latency or the additive latency is set to zero. The turn off time is determined by combining the information indicating an enable or disable of an active termination control with burst length information. In one embodiment, determining a turn off time for the active termination control includes setting the turn off time to a burst length divided by two plus a multiple of a clock cycle after the turn on time of the active termination. A convenient multiple of a clock cycle is one equal to about one and one-half clock periods.

A memory such as memory 500 of FIG. 500 uses the received ATC signal, the CAS latency and burst length programmed into the mode register to set the turn on and turn off times for active termination. This operation is appropriate for a two slot system, where memory devices to which data is written or from which data is read are on a memory module in one slot, and the memory devices for active termination are on a memory module in the other slot. For a one slot system, another method can be applied. In one embodiment, a method for active termination control in a memory includes receiving an active termination control signal, ignoring the received active termination control signal, and turning on active termination in response to receiving a write command. The information for ignoring the received active termination control signal is programmed in a mode register of the memory. This information is typically stored as one or more bits in a mode register of the memory.

As with a two slot system, the turn on and turn off times are set using latency information and burst length information, respectively. Turning on active termination occurs at a CAS latency less two clock cycles plus an additive latency after receiving the write command. In one embodiment, setting the turning on time for he active termination includes using a zero additive latency. The active termination is maintained for a predetermined time after receiving write command. In one embodiment, the predetermined time is about a burst length divided by two plus one and a half clock cycles. In a one slot system, no termination is required for read operations.

Figure 10:
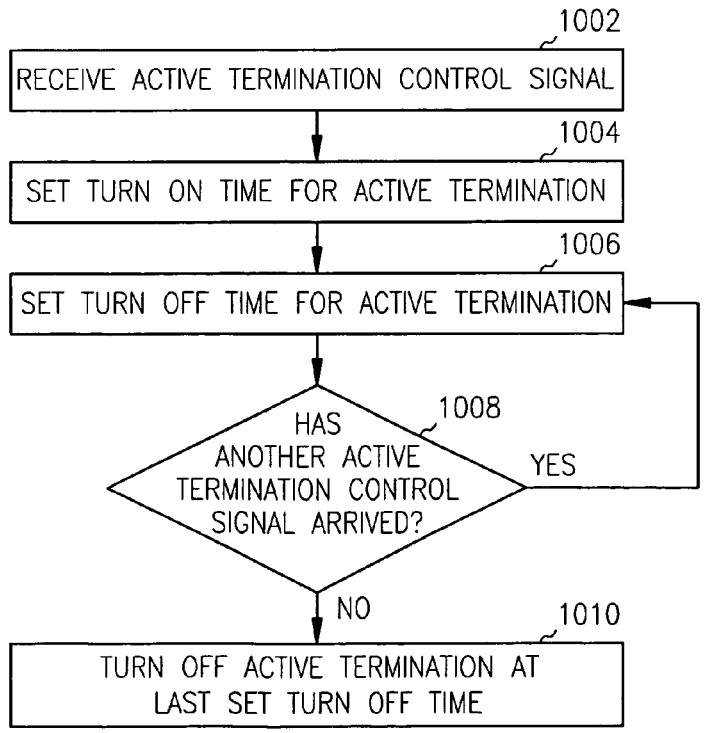
FIG. 10 shows a flow diagram of another embodiment for a method for extending active termination control, in accordance with the teachings of the present invention.

FIG. 10 shows a flow diagram of another embodiment for a method for extending active termination control, in accordance with the teachings of the present invention. A memory such as memory 500 of FIG. 5 is used on memory modules 230, 250 in system 200 of FIG. 2. At block 1002, memory 500 receives an active termination control signal. At block 1004, memory 500 sets turn on time for active termination. At block 1006, memory 500 sets turn off time for active termination. At block 1008, memory 500 determines whether another active termination control signal has arrived. If another active termination control signal has arrived, memory 500 returns to block 1006 to set a new turn off based on the latest active termination control signal. At block 1010, if another active termination control signal has not arrived, memory 500 turns off the active termination at the last set turn off time, which is based on the last ATC signal received. Thus, memory 500, in response to receiving another ATC signal while the active termination is on, maintains the active termination on for a predetermined time set relative to the last ATC signal received. Memory 500 uses the same procedure and parameters to determine the turn-off time based on the last ATC signal received as it performed for setting a turn-off time for the first ATC signal received. For instance, on receiving a second and last ATC signal, a timer is reset for the active termination to last a burst length divided by two plus one and one-half clock cycles after a turn on time associated with the last active termination control signal.

Figure 11:
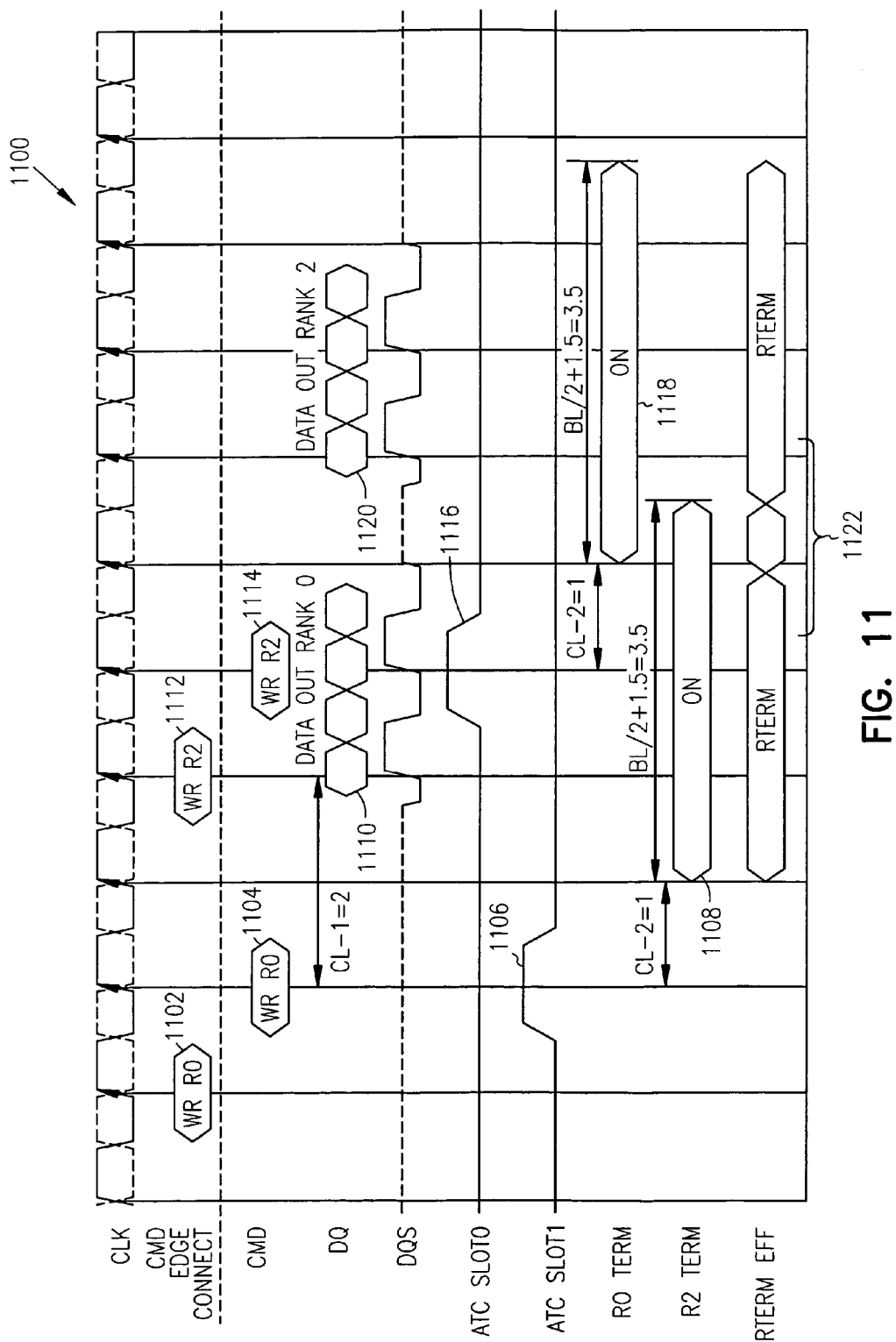
FIG. 11 shows a timing diagram for a write operation to memories with a CAS latency of three and burst length of four in an embodiment of a method for active termination control, in accordance with the teachings of the present invention.

FIG. 11 shows a timing diagram 1100 for a write operation to memories with a CAS latency of three and burst length of four in an embodiment of a method for active termination control, in accordance with the teachings of the present invention. Timing diagram 1100 can be applied to system 200 of FIG. 2 for discussion purposes. At 1102, a write command on a system command bus 260 is detected by module registers 232, 252. Since this command is detected by module register 232, 252 effectively snooping the system command bus 260, it is indicated in FIG. 11 as a command edge connect. At 1102, WR RO means write to rank zero indicating a write command for writing to memories of the first rank on module one. The term, WR R2, meads a write to rank two indicating a write command to memories on the second module. Thus, on the command bus, controller 220 is sending write commands to memory module 230 in slot 0 and memory module 250 in slot 1 with two different writes. At 1104, module register 232, since it's clocked, delays the write command on memory module 230 by one clock cycle as it goes through the module register. At 1106, module register 252 fires an ATC signal for memory module 250 in slot 1 coincident with the write command from memory register 232 to slot zero, while module register 232 does not send out an ATC pulse or signal to memory module 230.

At 1108, the active termination turns on for memory module 250 in slot 1 at a CAS latency minus two clock cycles. For the CAS latency set at three, the active termination turns on one clock cycle after the memory devices on memory module 250 in slot 1 receive the ATC signal. At 1110, on the DQ lines, the data in for rank 0, module 230, begins at CAS latency minus one with a burst length of four, driven by DQS.

At 1112, a write to rank two indicating a write command to memories on the second module is generated by controller 220 on system command bus 260. At 1114, module register 252 of memory module 250 regenerates the write command for memory devices on memory module 250 in slot 1.

At 1116, module register 232 of memory module 230 generates an ATC pulse or signal for memory devices on memory module 230 in slot 0. At 1118, since the CAS latency is three, the active termination for memory module 230 in slot 0 turns on one clock cycle after receiving the ATC signal that coincides with the write command regenerated by memory register 252 for memory devices on memory module 250 in slot 1. At 1120, on the DQ lines, the data in for rank 2, module 250, begins at CAS latency minus one with a burst length of four, driven by DQS.

The active termination on memory module 250 in slot 1 turns off at the burst length of 4 divided by 2, plus one and one-half clock cycles providing an off time of about three and one-half clock cycles after turning on. As can be seen from FIG. 11, the active termination on memory module 250 in slot 1 completely brackets the writing of data in memory devices on memory module 230 in slot 0. Likewise, the active termination on memory module 230 in slot 0 completely brackets the writing of data in memory devices on memory module 250 in slot 1. For the case demonstrated in FIG. 11, there is a period of time for which the active termination on memory module 230 in slot 2 and the active termination on memory module 250 in slot 1 are both on. This does not cause any problems since there is nothing on the data bus at that time. The effective active termination for system 200 is shown at 1122, which demonstrates that active termination is effectively maintained for the two write commands sequence close together in time.

Since the turning on and off of the active termination occurs on memory devices on different memory modules that use a common DQ bus, the memory devices on both memory modules need to operate with the same CAS latency, and the same burst length. In addition, the command bus needs to be shared by both memory modules, since the generation of an ATC signal on one memory module and subsequent turning on and off of the active termination is performed assuming command operations are being performed on the other memory in an associated time frame.

Figure 12:
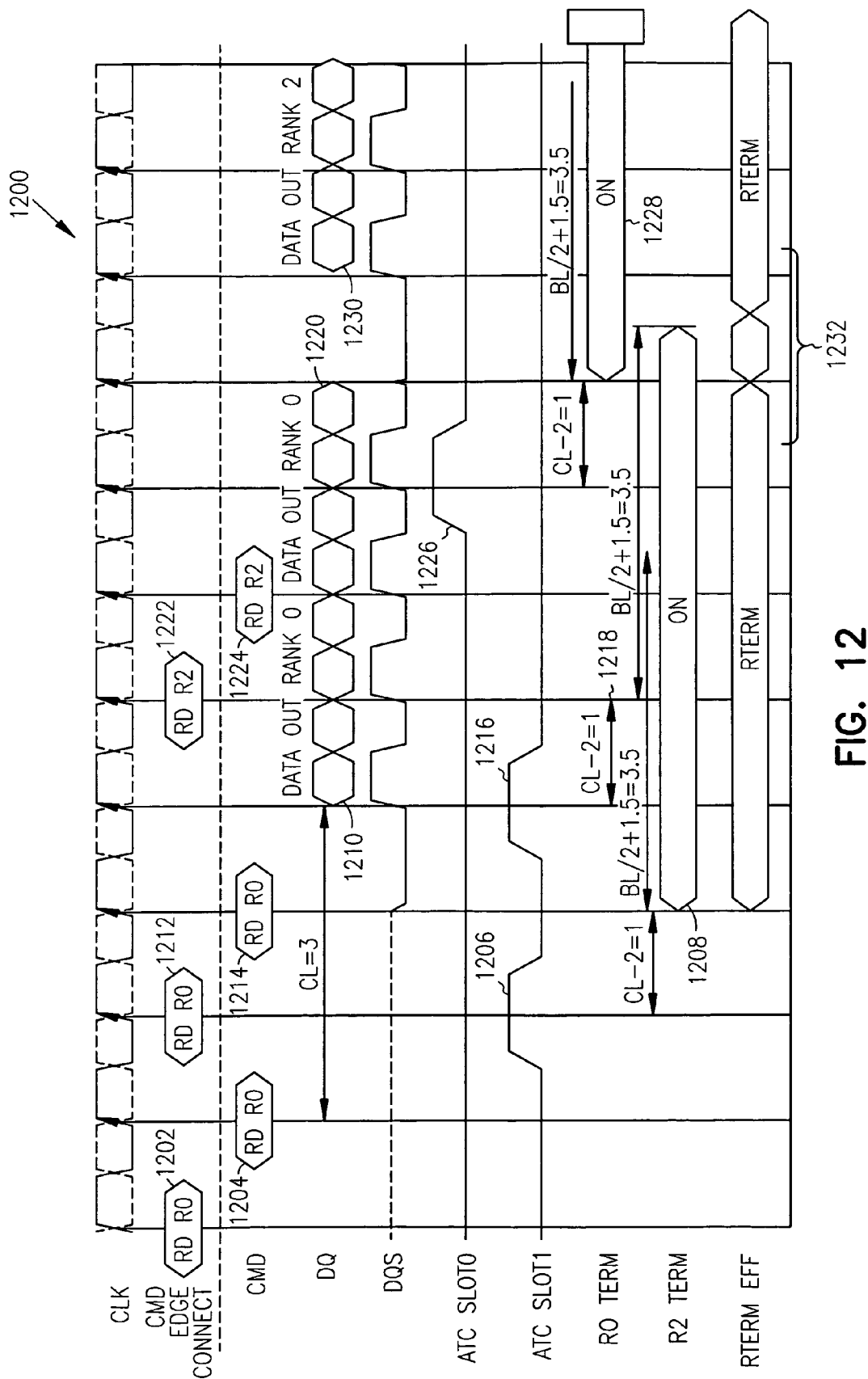
FIG. 12 shows a timing diagram for a read operation in memories with a CAS latency of three and burst length of four in an embodiment of a method for active termination control including extending active termination control, in accordance with the teachings of the present invention.

FIG. 12 shows a timing diagram 1200 for a read operation in memories with a CAS latency of three and burst length of four in an embodiment of a method for active termination control including extending active termination control, in accordance with the teachings of the present invention. Timing diagram 1200 can be applied to system 200 of FIG. 2 for discussion purposes. At 1202, a read command on a system command bus 260 is detected by module registers 232, 252. RD RO means read to rank zero indicating a read command for reading memories of the first rank on module one. The term, RD R2, meads a read of rank two indicating a read command to memories on the second module. At 1204, module register 232, since it's clocked, delays the read command on memory module 230 by one clock cycle as it goes through the register. At 1206, module register 252 on the memory module 250 fires an ATC signal that is delayed one clock cycle from module register 232 issuing a read command for memories on memory module 230. This coordination in timing is facilitated by module registers 232, 252 both receiving common clock signals and both snooping a common system bus. Module register 232 does not send out an ATC pulse or signal to memory module 230 to which a read operation is to be performed on memory module 230 in slot 0.

At 1208, the active termination turns on for memory module 250 in slot 1 at a CAS latency minus two clock cycles. For the CAS latency set at three, the active termination turns on one clock cycle after the memory devices on memory module 250 receive the ATC signal. The memories also determine a turn off time at the burst length divided by two plus one and one half clock cycles after turning on the active termination. For a burst length of four, the memories set a turn-off time at three and one-half clock cycles after the turning on of the active termination. At 1210, on the DQ lines, the data out for rank 0, module 230, begins at CAS latency minus one with a burst length of four, driven by DQS.

However, prior to turning on the active termination for memory devices on memory module 250 in slot 1, controller 220 issues another read command at 1212. At 1214, module register 232 of memory module 230 in slot 0 issues a read command to the memory devices on memory module 230 one clock cycle after detecting the 1212 read command on the system command bus 260. One clock cycle after module register 232 issues the 1214 read command, at 1216, module register 252 on memory module 250 generates another ATC signal for the memories on memory module 250 in slot 1. The memories receiving this second ATC signal on memory module 250 determine a new active termination turn on time and a new turn off time based on the arrival of the second ATC signal. From FIG. 12, the new turn on time begins at two clock cycles after the first turn on time at 1218, which is before the scheduled turn off time determined from the first ATC signal received. The memories will reset the on time for the active termination based on the second ATC signal received and will set the turn off time at three and one-half clock cycles for the newly determined turned on time. Thus, the active termination stays on between the two read operations for memories on memory module 230 in slot 0.

At 1220, on the DQ lines, the data out for rank 0, module 230, is read out in response to the second read command to the memories of memory module 230 in slot 0. This data is immediately read out following the data read with respect to the first read command. As can be seen in FIG. 12, the complete read out of data from memory module 230 in slot 0 following the two read commands is completely bracketed with the active termination in an on state in memory devices on memory module 250 in slot 1.

At 1222, prior to the completion of the read operations for memories on memory module 230 in slot 230, controller 220 issues a read command for memories on memory module 250 in slot 1. At 1224, module register 252 issues a read command to memory devices on memory module 250 one clock cycle after detecting a read command on the system command bus 260. One clock cycle after memory register 252 issues a read command, memory module 232 generates an ATC signal for memory devices on memory module 230 in slot 0. Then one cycle later, which is the CAS latency minus two clock cycles, the active termination is on, at 1228, in memory devices on memory module 230 in slot 0. At 1230, on the DQ lines, the data out for rank 2, module 250, begins at CAS latency minus one with a burst length of four, driven by DQS. At 1232, the effective active termination for the system brackets both reads on memory module 230 and the read on memory module 250. The on state of active termination on memory devices on memory module 230 overlaps the on state of active termination on memory devices on memory module 250 for a short period of time. During this overlap period of time, no data is on the system data bus.

For all the read and write commands, the turn on times and turn off times are the same. For a CAS latency of three and burst length of 4, the turn on time is one clock cycle after receiving the ATC signal, while the turn off time is three and one-half clock cycles after turning on the active termination. The turn off time is modified if additional read or write commands are monitored causing new active termination turn on times to be determined that are scheduled prior to turning off the active termination from a previous read or write command. Of course, the relative turn on and turn off times can be changed by reprogramming all the memories with a CAS latency different than three and a burst length different than four. However, as noted earlier, since read and write operations are being performed on memories devices on one memory module and active termination is being performed on memories devices on other memory, the timing requirements for all memories are the same with all memories having the same CAS latency and burst length along with receiving a common clock and being coupled to a common bus.

CONCLUSION

The above structures and methods have been described by way of example, and not by way of limitation, with respect to active termination through an on module register. A method and apparatus are provided for active termination control in a memory by an module register providing an active termination control signal to the memory. The module register monitors a system command bus for read and write commands. In response to detecting a read or write command, the module register generates an active termination control signal to the memory. The memory turns on active termination based on information programmed into one or more mode registers of the memory. In one embodiment, the CAS latency is used to determine a turn on time, and the burst length is used to determine a turn off time following the turn on of the active termination.

As a result of this method, the number of ports, or pins, to provide termination in a system is reduced. In the various embodiments, pins for active termination control are not need on a system controller, a motherboard, or memory modules.

Although specific embodiments have been illustrated and described herein, it will be appreciated by those of ordinary skill in the art that any arrangement that is calculated to achieve the same purpose may be substituted for the specific embodiment shown. This application is intended to cover any adaptations or variations of the present invention. It is to be understood that the above description is intended to be illustrative, and not restrictive. Combinations of the above embodiments, and other embodiments will be apparent to those of skill in the art upon reviewing the above description. The scope of the invention includes any other applications in which the above structures and fabrication methods are used. The scope of the invention should be determined with reference to the appended claims, along with the full scope of equivalents to which such claims are entitled.

What is claimed is:

1. A computer-readable medium having computer-executable instructions for performing a method comprising:
   determining a set of bits to send and load into a memory;
   arranging the bits in a predetermined format; and
   outputting the set of bits, wherein the set of bits includes a bit selected from a group of a bit to select a single slot or a dual slot system and a bit to enable or disable active termination control.

2. The computer-readable medium of claim 1, wherein determining a set of bits to send and load into a memory includes determining bits to load into one or more registers of the memory.

3. The computer-readable medium of claim 1, wherein arranging the bits in a predetermined format includes arranging bits to load into a mode register of the memory and arranging bits to load into an extended register of the memory.

4. The computer-readable medium of claim 1, wherein arranging the bits in a predetermined format includes arranging the bits to load into the memory via an address bus.

5. The computer-readable medium of claim 1, wherein the set of bits includes one or more bits to select multiple termination values.

6. The computer-readable medium of claim 5, wherein the one or more bits to select multiple termination values select either a 75 ohm termination value or a 150 ohm termination value.

7. The computer-readable medium of claim 1, wherein outputting the set of bits includes outputting the set of bits during an initialization with the memory.

8. A computer-readable medium having computer-executable instructions for performing a method comprising:
   determining a set of bits to send and load into a memory;
   arranging the bits in a predetermined format; and
   outputting the set of bits, wherein the set of bits includes a bit to enable or disable active termination control.

9. The computer-readable medium of claim 8, wherein determining a set of bits includes determining a CAS latency and a burst length.

10. The computer-readable medium of claim 8, wherein determining a set of bits to send and load into a memory includes determining bits to load into one or more registers of the memory.

11. The computer-readable medium of claim 8, wherein arranging the bits in a predetermined format includes arranging bits to load into a mode register of the memory and arranging bits to load into an extended register of the memory.

12. The computer-readable medium of claim 8, wherein arranging the bits in a predetermined format includes arranging bits related to a CAS latency and a burst length to load into a mode register of the memory and arranging one or more bits bit to enable or disable active termination control to load into an extended register of the memory.

13. The computer-readable medium of claim 8, wherein arranging the bits in a predetermined format includes arranging the bits to load into the memory via an address bus.

14. The computer-readable medium of claim 8, wherein the set of bits includes one or more bits to select multiple termination values.

15. The computer-readable medium of claim 14, wherein the one or more bits to select multiple termination values select either a 75 ohm termination value or a 150 ohm termination value.

16. The computer-readable medium of claim 8, wherein outputting the set of bits includes outputting the set of bits during an initialization with the memory.

17. A computer-readable medium having computer-executable instructions for performing a method comprising:
    determining a set of bits to send and load into a memory;
    arranging the bits in a predetermined format; and
    outputting the set of bits, wherein the set of bits includes at least one bit to select a single slot or a dual slot system.

18. The computer-readable medium of claim 17, wherein the at least one bit to select a single slot or a dual slot system is configured to a state to select a single slot system to program the memory to ignore a received active termination control signal.

19. The computer-readable medium of claim 17, wherein the set of bits includes one or more bits to select multiple termination values.

20. The computer-readable medium of claim 19, wherein the one or more bits to select multiple termination values select either a 75 ohm termination value or a 150 ohm termination value.

21. The computer-readable medium of claim 17, wherein the set of bits includes one or more bits to enable or disable active termination control.

22. The computer-readable medium of claim 17, wherein determining a set of bits to send and load into a memory includes determining bits to load into one or more registers of the memory.

23. A computer-readable medium having stored thereon a data structure comprising:
    a field containing data, the data selected from a group of data representing a single slot or a dual slot memory system and data representing enabling or disabling active termination control for a memory.

24. The computer-readable medium of claim 23, wherein the field contains data representing a single slot or a dual slot memory system.

25. The computer-readable medium of claim 24, wherein the field includes one bit to select a single slot or a dual slot system.

26. The computer-readable medium of claim 24, wherein the data structure includes a field containing data representing multiple termination values for a memory.

27. The computer-readable medium of claim 26, wherein the field containing data representing multiple termination values includes one or more bits to select a 75 ohm termination value or a 150 ohm termination value.

28. The computer-readable medium of claim 24, wherein the data structure includes a field having one or more bits containing data representing enabling or disabling active termination control for the memory.

29. The computer-readable medium of claim 23, wherein the field includes data representing enabling or disabling active termination control for the memory.

30. The computer-readable medium of claim 29, wherein the data structure includes a field containing data having one or more bits to select a 75 ohm termination value or a 150 ohm termination value.

31. A computer-readable medium having computer-executable instructions stored thereon such that when executed cause operations comprising: generating a data signal for a memory device embodied in a set of electrical signals including data selected from a group of data representing a single slot or a dual slot memory system and data representing enabling or disabling active termination control for the memory device.

32. The computer-readable medium of claim 31, wherein the data includes data representing a single slot or a dual slot system including a data portion to select the single slot or the dual slot system.

33. The computer-readable medium of claim 32, wherein the data portion to select a single slot or a dual slot system includes a bit to select a single slot or a dual slot system, the data portion configured to a state to select a single slot system programs the memory device to ignore a received active termination control signal.

34. The computer-readable medium of claim 32, wherein the data signal further includes data representing selection of multiple active termination values including a data portion having one or more bits to select either a 75 ohm termination value or a 150 ohm termination value.

35. The computer-readable medium of claim 32, wherein the data signal includes data representing enabling or disabling an active termination control in the memory device including a data portion having one or more bits to enable or disable the active termination control.

36. The computer-readable medium of claim 31, wherein the data includes data representing enabling or disabling an active termination control in the memory device including a data portion having one or more bits to enable or disable the active termination control.

37. The computer-readable medium of claim 36, wherein the data signal includes data representing selection of multiple active termination values including a data portion having one or more bits to select either a 75 ohm termination value or a 150 ohm termination value.

* * * * *

UNITED STATES PATENT AND TRADEMARK OFFICE
CERTIFICATE OF CORRECTION

| | | |
|---|---|---|
| PATENT NO. | : 7,389,369 B2 | Page 1 of 1 |
| APPLICATION NO. | : 11/216672 | |
| DATED | : June 17, 2008 | |
| INVENTOR(S) | : Janzen | |

It is certified that error appears in the above-identified patent and that said Letters Patent is hereby corrected as shown below:

In column 15, line 53, in Claim 12, before "to enable" delete "bit".

In column 16, line 59, in Claim 31, after "device" insert -- , the data signal --.

Signed and Sealed this

Thirtieth Day of September, 2008

JON W. DUDAS
*Director of the United States Patent and Trademark Office*